(12) United States Patent
Döring et al.

(10) Patent No.: US 10,344,656 B2
(45) Date of Patent: Jul. 9, 2019

(54) MIXING APPARATUS FOR AN EXHAUST GAS AFTERTREATMENT SYSTEM, EXHAUST GAS AFTERTREATMENT SYSTEM AND INTERNAL COMBUSTION ENGINE

(71) Applicant: MAN DIESEL & TURBO SE, Augsburg (DE)

(72) Inventors: Andreas Döring, München/Unterhaching (DE); Ingo Bader, Fürstenfeldbruck (DE)

(73) Assignee: MAN Energy Solutions SE, Augsburg (DE)

( * ) Notice: Subject to any disclaimer, the term of this patent is extended or adjusted under 35 U.S.C. 154(b) by 21 days.

(21) Appl. No.: 15/833,489

(22) Filed: Dec. 6, 2017

(65) Prior Publication Data

US 2018/0163601 A1 Jun. 14, 2018

(30) Foreign Application Priority Data

Dec. 9, 2016 (DE) .......................... 10 2016 224617

(51) Int. Cl.
| | |
|---|---|
| *F01N 1/02* | (2006.01) |
| *F01N 1/04* | (2006.01) |
| *F01N 3/20* | (2006.01) |
| *F01N 3/28* | (2006.01) |
| *B01D 53/94* | (2006.01) |

(52) U.S. Cl.
CPC ....... *F01N 3/2892* (2013.01); *B01D 53/9418* (2013.01); *F01N 1/023* (2013.01); *F01N 1/04* (2013.01); *F01N 3/2066* (2013.01); *F01N 3/2882* (2013.01); *F01N 3/2885* (2013.01); *F01N 2230/04* (2013.01); *F01N 2340/00* (2013.01); *F01N 2340/02* (2013.01); *F01N 2470/04* (2013.01); *F01N 2470/20* (2013.01); *F01N 2610/02* (2013.01)

(58) Field of Classification Search
CPC combination set(s) only.
See application file for complete search history.

(56) References Cited

U.S. PATENT DOCUMENTS

| 8,752,370 B2 * | 6/2014 | Hittle ...................... F01N 3/103 60/274 |
| 9,476,337 B2 * | 10/2016 | Kobayashi ................ F01N 3/10 |

(Continued)

FOREIGN PATENT DOCUMENTS

DE  10 2015 103 303  9/2013

*Primary Examiner* — Binh Q Tran
(74) *Attorney, Agent, or Firm* — Cozen O'Connor

(57) ABSTRACT

A mixing apparatus for mixing a precursor substance of a reducing agent with exhaust gas, having a housing that provides a mixing chamber and a silencer. The housing inlet side has an inlet connection for exhaust gas and an outlet side having an outlet connection for reducing agent intermixed with the exhaust gas to be discharged. Longitudinal axes of the inlet and outlet connections are offset and parallel relative to one another. An introduction device introduces a precursor substance of the reducing agent and is positioned at the inlet side in a region of the outlet connection longitudinal axis. A length of the housing between the inlet and outlet side at least 1.9 to 7 times a diameter of the inlet connection. A width of the housing is maximally 3 times the diameter of the inlet connection.

20 Claims, 2 Drawing Sheets

(56) References Cited

U.S. PATENT DOCUMENTS

| | | | |
|---|---|---|---|
| 9,482,154 B2* | 11/2016 | Van Niekerk | F01D 25/30 |
| 9,677,440 B2* | 6/2017 | Fischer | F01N 3/10 |
| 9,976,470 B2* | 5/2018 | Isada | F01N 3/2066 |
| 2006/0150614 A1* | 7/2006 | Cummings | F01N 1/088 60/275 |

* cited by examiner

MIXING APPARATUS FOR AN EXHAUST GAS AFTERTREATMENT SYSTEM, EXHAUST GAS AFTERTREATMENT SYSTEM AND INTERNAL COMBUSTION ENGINE

BACKGROUND OF THE INVENTION

1. Field of the Invention

The invention relates to a mixing apparatus for an exhaust gas aftertreatment system, an exhaust gas aftertreatment system of an internal combustion engine, and an internal combustion engine having an exhaust gas aftertreatment system.

2. Description of the Related Art

In combustion processes in stationary combustion engines, which are employed for example in power plants, and in combustion processes in non-stationary internal combustion engines, which are employed for example on ships, nitrogen oxides are created. These nitrogen oxides are typically created during the combustion of sulphur-containing fossil fuels such as coal, pit coal, brown coal, crude oil, heavy fuel oil, or diesel fuels. For this reason, exhaust gas aftertreatment systems are assigned to such internal combustion engines, which serve for cleaning, in particular denitrifying the exhaust gas of the internal combustion engine.

For reducing nitrogen oxides in the exhaust gas, primarily so-called catalytic converters are employed in exhaust gas aftertreatment systems known from practice. In an SCR catalytic converter, a selective catalytic reduction of nitrogen oxides takes place, wherein for the reduction of the nitrogen oxides ammonia ($NH_3$) is required as reducing agent. An ammonia precursor substance, such as for example urea, is introduced into the exhaust gas in liquid form upstream of the SCR catalytic converter. The ammonia precursor substance is mixed with the exhaust gas upstream of the SCR catalytic converter and blended to form the reducing agent. For this purpose, a mixing and decomposition section between an introduction device of the ammonia precursor substance and the SCR catalytic converter is provided according to the practice.

From DE 10 2015 103 303 B3 a mixing apparatus for an exhaust gas aftertreatment system of an internal combustion engine designated as mixing box is known, which serves for mixing additives into an exhaust gas flow. This mixing apparatus comprises a housing, which provides a mixing chamber for exhaust gas and additive, wherein the housing at an inlet side comprises an inlet connection for a feed line, via which the exhaust gas can be introduced into the housing, and the housing at an outlet side located opposite the inlet side comprises an outlet connection for a discharge line, via which exhaust gas and additive mixed with the exhaust gas can be discharged from the housing. Longitudinal axes of inlet connection or feed line and outlet connection or discharge line are offset relative to one another and run parallel to one another. The housing receives an introduction device formed as injection nozzle for introducing additives into the exhaust gas, which is positioned at the inlet side of the housing at the region of the longitudinal axis of the outlet connection.

Although an exhaust gas, in particular a nitrogen oxide reduction, can already be successfully effected with exhaust gas aftertreatment systems known from practice, which comprise an SCR catalytic converter, there is a need for further improving the exhaust gas aftertreatment system. In particular, there is a need for making possible, with a compact design, a low-noise and effective exhaust gas aftertreatment.

SUMMARY OF THE INVENTION

An object of one aspect of the present invention is a new type of mixing apparatus for an exhaust gas aftertreatment system, an exhaust gas aftertreatment system, and an internal combustion engine having an exhaust gas aftertreatment system, which with compact design make possible a low-noise and effective exhaust gas aftertreatment.

According to one aspect of the invention, a housing of the mixing apparatus provides a mixing chamber and a silencer, wherein the housing at an inlet side comprises an inlet connection for a feed line, via which the exhaust gas can be introduced into the housing, wherein the housing at an outlet side located opposite the inlet side comprises an outlet connection for a discharge line, via which the exhaust gas and reducing agent mixed with the exhaust gas can be discharged from the housing, wherein longitudinal axes of inlet connection and outlet connection are offset relative to one another and run parallel or at a right angle to one another, wherein the housing receives an introduction device for introducing the precursor substance of the reducing agent into the exhaust gas, which is positioned at the inlet side in the region of the longitudinal axis of the outlet connection. A length of the housing between the inlet side and the outlet side of the housing and thus a length of the mixing chamber amounts to at least 1.9 times and maximally 7 times the diameter of the inlet connection or the feed line. A width of the housing between walls of the housing extending between the inlet side and the outlet side of the housing amounts to maximally 3 times the diameter of the inlet connection or the feed line. The mixing apparatus according to one aspect of the invention allows, with compact dimensions, an effective intermixing of the ammonia precursor substance with the exhaust gas and therefore an effective exhaust gas aftertreatment. The housing of the mixing apparatus providing the mixing chamber furthermore provides a silencer to render the exhaust gas aftertreatment low in noise. With compact design, a low-noise and effective exhaust gas aftertreatment is made possible.

Preferentially, the length of the housing amounts to at least 2.2 times, preferably at least 3.3 times, the diameter of the inlet connection or of the feed line. The width of the housing amounts to maximally 2.5 times, preferably maximally 1.8 times the diameter of the inlet connection or of the feed line. The characteristics allow, with compact dimension, an effective and low-noise exhaust gas aftertreatment.

According to an advantageous further development, the diameter of the outlet connection or of the discharge line is dimensioned in such a manner that a flow velocity in the region of the outlet connection amounts to maximally 70 m/s, preferably maximally 60 m/s, particularly preferably at least 50 m/s. These features serve in particular for the further noise reduction.

According to a further advantageous development, a height of the housing is dimensioned in such a manner that the offset of the longitudinal axes of inlet connection and outlet connection amounts to at least 1 times, preferably at least 1.5 times, particularly preferably at least 2 times the diameter of the inlet connection or of the feed line. These features also serve for providing a compact design with effective and low-noise exhaust gas aftertreatment at the same time.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

The invention relates to a mixing apparatus for an exhaust gas aftertreatment system of an internal combustion engine, to an exhaust gas aftertreatment system having such a mixing apparatus and to an internal combustion engine having such an exhaust gas aftertreatment system.

Figure 1:
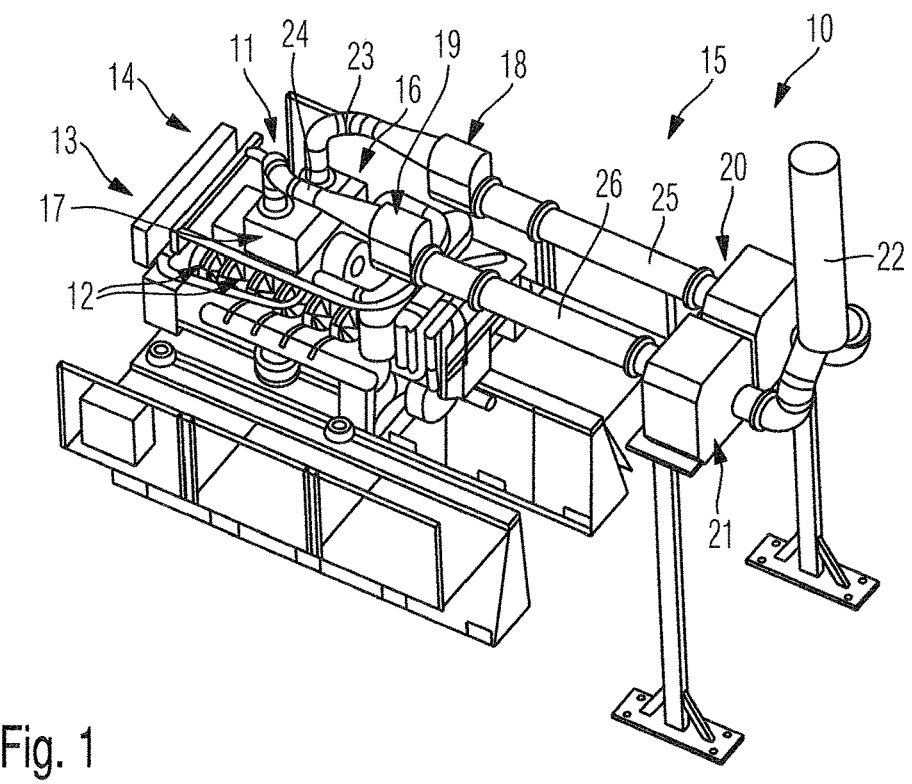
FIG. 1 is a perspective view of an internal combustion engine according to one aspect of the invention with an exhaust gas aftertreatment system and a mixing apparatus.
Figure 2:
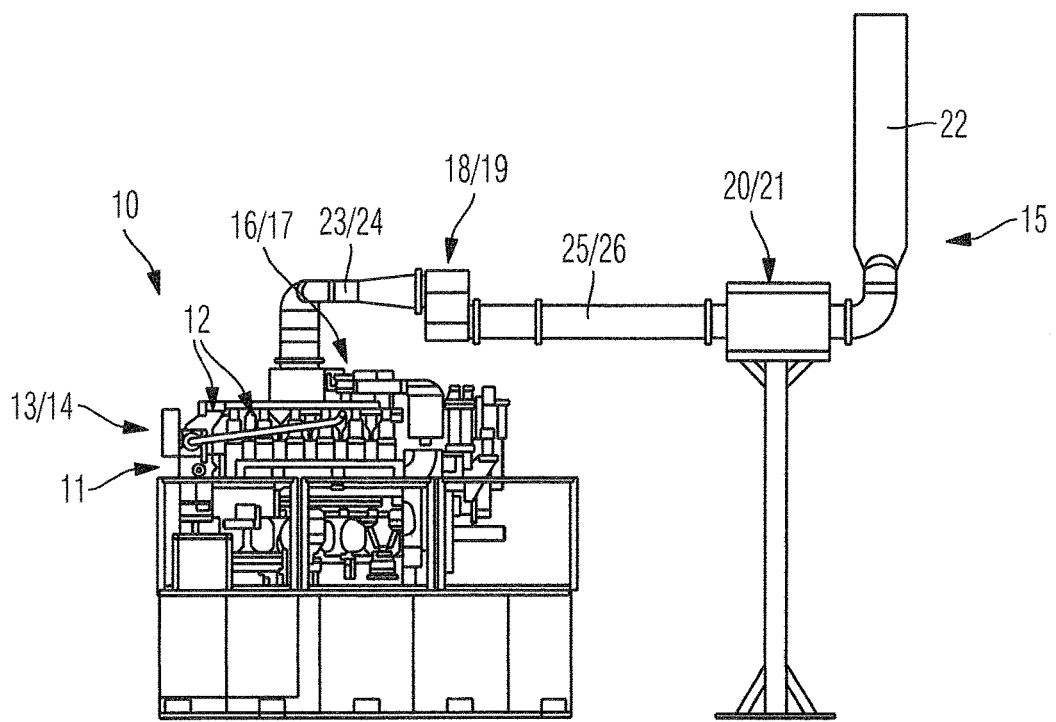
FIG. 2 is a lateral view of the internal combustion engine of FIG. 1.

FIGS. 1 and 2 show different views of a preferred embodiment of an internal combustion engine 10, wherein the internal combustion engine 10 comprises an engine block 11 with a plurality of cylinders 12, which in the shown exemplary embodiment form two cylinder banks 13, 14. Furthermore, the internal combustion engine 10 comprises an exhaust gas aftertreatment system 15, which serves for the exhaust gas aftertreatment of the exhaust gas leaving the cylinders 12.

In the internal combustion engine shown in FIGS. 1 and 2, each cylinder bank 13, 14 is assigned at least one exhaust gas turbocharger 15 and 16 respectively, wherein exhaust gas, which leaves the cylinders 12 of the respective cylinder bank 13, 14, is initially conducted via a turbine of the respective exhaust gas turbocharger 15, 16 in order to expand the exhaust gas in the turbine of the respective exhaust gas turbocharger 15, 16 and extract energy in the process. This energy extracted in the turbine of the respective exhaust gas turbocharger 15 and 16 is utilized in a compressor of the respective exhaust gas turbocharger 15, 16 to compress charge air to be fed to the internal combustion engine.

The exhaust gas, which leaves the respective exhaust gas turbocharger 15, 16, namely the turbine of the same, is subsequently conducted via further assemblies of the exhaust gas aftertreatment system 17, namely via mixing apparatuses 18, 19 and emission control devices 20, 21.

In the shown preferred exemplary embodiment of the internal combustion engine 10 of FIGS. 1 and 2, each cylinder bank 13, 14 is assigned a separate mixing apparatus 18 and 19 respectively and a separate emission control device 20, 21 in each case, wherein the exhaust gas of the two cylinder banks 13, 14, which is conducted via the separate mixing apparatuses 18, 19 and separate emission control devices 20, 21 is united downstream of the emission control devices 20, 21 and discharged via a common stack or chimney 21 into the environment.

FIGS. 1 and 2 shows that an exhaust line 23 and 24 respectively extending between the respective turbocharger 15, 16 and the respective mixing apparatus 18, 19 has a diversion of maximally 180°, preferentially of maximally 150°, particularly preferably of maximally 120°.

Accordingly, the exhaust gas leaving the turbochargers 16, 17 of the cylinder banks 13, 14 is diverted via the exhaust line 23, 24 extending between the cylinders 12 and the mixing apparatuses 18, 19 in each case once by approximately 90° from a vertical flow conduction into a horizontal flow conduction and if required in the following at least once by maximally 60°, preferably by maximally 30° in the horizontal flow conduction in each case to feed the exhaust gas, emanating from the exhaust gas turbochargers 16, 17, to the mixing apparatuses 18, 19.

In FIGS. 1 and 2, further exhaust lines 25, 26 extend between the respective mixing apparatuses 18, 19 and the respective emission control devices 20, 21 namely in the preferred exemplary embodiment of FIGS. 1 and 2 in such a manner that this exhaust line 25, 26 extending between the respective mixing apparatus 18, 19 and the respective emission control device 20, 21 is diversion-free, alternatively has a diversion of maximally 100°, preferably of maximally 60°, particularly preferably of maximally 30°.

The length of the exhaust lines 25 and 26 is advantageously designed so that between the mixing apparatuses 18 and 19 and the emission control devices 20, 21 a running length of $\lambda/4$ with respect to the ignition frequency or their modes materializes. By way of this embodiment, these frequencies can be specifically dampened.

Figure 3:
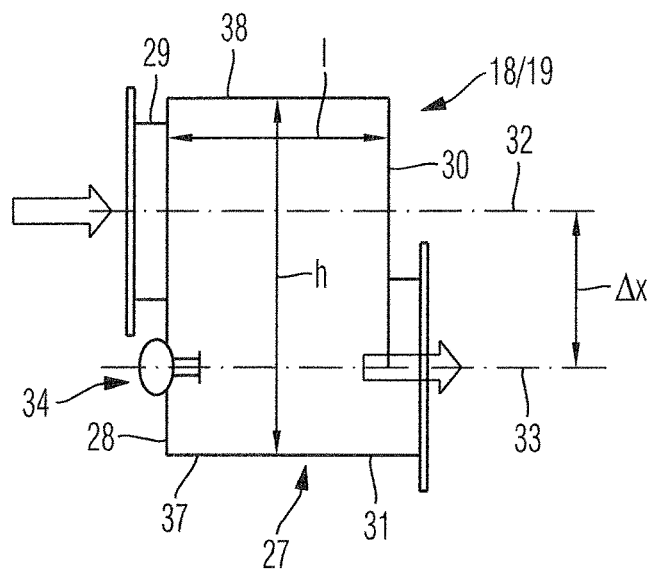
FIG. 3 is a lateral view of a detail of FIG. 1 in the region of the mixing apparatus.
Figure 4:
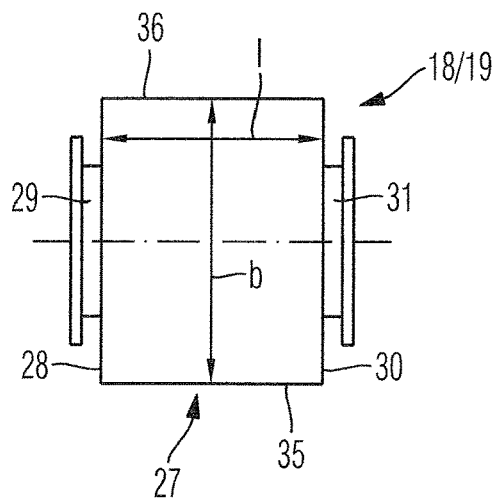
FIG. 4 is a plan view of the detail of FIG. 3.

FIGS. 3 and 4 show details of a mixing apparatus 18, 19 of the exhaust gas aftertreatment system 15, wherein the mixing apparatus is a device that serves for the mixing of a precursor substance of a reducing agent for an SCR exhaust gas aftertreatment, namely for mixing an ammonia precursor substance such as urea with exhaust gas.

Each mixing apparatus 18 and 19 comprises a respective housing 27, which on the one hand provides a mixing chamber and on the other hand a silencer, namely in the internal combustion engine of FIG. 1, 2 a front silencer, which is designed for the sound damping of frequencies that are higher than a limit value.

At an inlet side 28, the housing 27 comprises an inlet connection 29 for a feed line, namely for one of the exhaust lines 23 and 24 respectively. By way of the inlet connection 29 of the inlet side 28, exhaust gas can be introduced into the housing of the mixing apparatus 18, 19. Furthermore, the housing 27, at an outlet side 30 located opposite the inlet side 28, comprises an outlet connection 31 for a discharge line, namely for one of the exhaust lines 25, 26. Exhaust gas and reducing agent intermixed with the exhaust gas can be conducted out of the housing 27 via the outlet connection 31. A longitudinal center axis 32 of the inlet connection 29 or of the respective feed line and a longitudinal center axis 33 of the respective outlet connection 31 or the respective discharge line 25 and 26 are offset relative to one another by the amount ΔX and run parallel to one another.

At the inlet side 28, the housing 28 receives an introduction device 34, which serves for introducing the precursor substance of the SCR reducing agent into the exhaust gas. The introduction device 34 is preferentially designed as an injection nozzle, which is positioned at the inlet side 28 in the region of the longitudinal axis 33 of the outlet connection 31 or lies on that longitudinal axis 33.

The housing 27 of each mixing apparatus 18 and 19, has a length l between the inlet side 28 and the outlet side 30 of the housing 27, which amounts to at least 1.9 times and maximally 7 times the diameter of the inlet connection 29 or of the feed line connected to the inlet connection 29, namely the diameter of the exhaust line 23 and 24 respectively in the region of the inlet connection 29. A width b of the housing 27 between walls extending between the inlet side 28 and the outlet side 30, namely side walls 35, 36 of the housing 27, amounts to maximally 3 times, preferably maximally 2.5 times, particularly preferably maximally 1.8 times the diameter of the inlet connection 29. Preferentially, the length l of the housing amounts to at least 2.2 times, particularly preferably at least 3 times and maximally 7 times the diameter of the inlet connection 29. Using these parameters, an effective intermixing of the precursor substance of the SCR reducing agent with the exhaust gas and decomposition and thus ultimately an effective exhaust gas aftertreatment can be ensured with compact design.

As already explained, the housing 27 does not only act as mixing chamber but also as front silencer for damping frequencies that are higher than a defined limit value. The sound damping can be provided in that in the housing 27 at least one sound damping chamber is formed, namely in such a manner that the same forms a Helmholtz resonator or a λ/4-resonator or an absorption resonator or a reflective silencer.

A height h of the housing 27 between a bottom side 37 and a top side 38 of the housing 27 is dimensioned in such a manner that the offset Δx between the longitudinal axes 32, 33 of inlet connection 29 and outlet connection 31 amounts to at least 1 times, preferably at least 1.5 times, particularly preferably at least 2 times the diameter of the inlet connection 29. These features also serve for providing an effective exhaust gas aftertreatment with compact design and low noise development.

It is provided, in particular, that the diameter of the inlet connection 29 and if appropriate, also the diameter of the outlet connection 31 amounts to at least 160 mm, preferably at least 190 mm, particularly preferably at least 200 mm. According to a particularly advantageous further development it is provided that the diameter of the outlet connection 31 is dimensioned in such a manner that a flow velocity of the exhaust gas in the region of the outlet connection 31 amounts to maximally 170 m/s, preferably maximally 60 m/s, particularly preferably maximally 50 m/s. By way of this, flow noise can be avoided and low-noise exhaust gas aftertreatment thereby ensured.

A perforated or slotted pipe can extend into the inlet connection 29 and into the outlet connection 31 in order to let the exhaust gas enter the housing via this perforated or slotted pipe in the region of the inlet connection 29 and let the exhaust gas leave the housing via the corresponding perforated or slotted pipe in the region of the outlet connection 21. Through these cross-sectional jumps, the mixing apparatus acts as a reflective silencer, as a result of which a further noise reduction can be realized. The free cross sections of these individual perforated or slotted apertures amount to maximally 20%, preferably maximally 10%, most preferably maximally 5% of the free cross section of the inlet connection 29.

As already explained, the mixing apparatus 18, 19 on the one hand serves for mixing the precursor substance of the SCR reducing agent with the exhaust gas and on other hand for providing a primary sound damping for frequencies that are greater than a limit value. In the exemplary embodiment of FIGS. 1 and 2, the exhaust gas conducted via the mixing apparatus 18, 19 together with the reducing agent intermixed with the exhaust gas and decomposed in the exhaust gas can be fed, via the exhaust lines 25, 26, to the respective emission control device 20 and 21, wherein the respective emission control device 20, 21 comprises a housing 39, which on the one hand forms a reactor chamber for receiving at least one SCR catalytic converter 40 and which furthermore provides a main silencer. Such a main silencer is then designed for the sound damping of frequencies that lie below the limit value.

Figure 5:
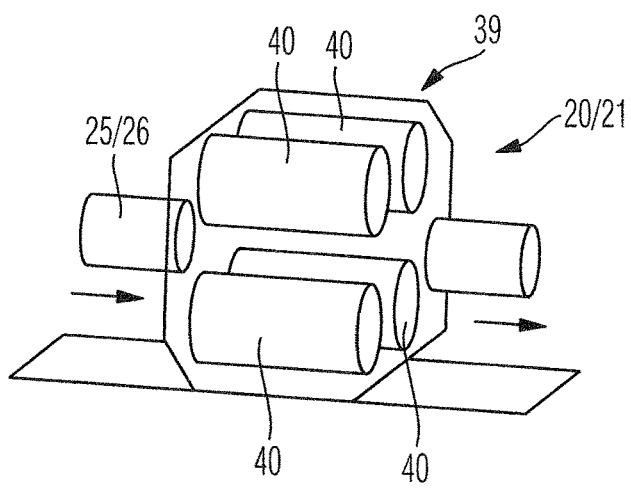
FIG. 5 is a perspective view of a detail of FIG. 1 in the region of an emission control device.

FIG. 5 shows a detail of an emission control device 20, 21, wherein in FIG. 5 a total of preferentially four SCR catalytic converters 40 are received in the housing 39 of the emission control device 20, 21, which are orientated parallel to one another and are embodied circular in the cross section. Two or three SCR catalytic converters 40 can also be received in the housing 39 of the emission control device 20, 21.

For providing the main silencer, the housing can again comprise at least one sound damping chamber, which forms a Helmholtz resonator of a λ/4-resonator or an absorption resonator or a reflective silencer. These sound damping chambers in the housing 39 of the emission control devices 20, 21 are preferentially embodied between the SCR catalytic converters 40 running parallel to one another.

By way of the design of the sound damping chamber of the mixing apparatus 18, 19 an insertion loss of at least 10%, preferably of at least 20%, particularly preferably of at least 30% of the joining damping of the main silencer provided by the emission control device 20, 21 is adjusted on the mixing apparatus 18, 19. The calculation of the insertion loss in this case is effected according to ISO11820.

Preferentially it is provided that a distance between the inlet side 28 of the housing 27 of the mixing apparatus 18 and 19 respectively and an inlet front face of the or each SCR catalytic converter 40 received in the housing 39 of the emission control device 20, 21 amounts to at least 3 times, preferably at least 4 times, particularly preferably at least 7 times the diameter of the inlet connection 29 of the housing 27 of the mixing apparatus 18, 19. This distance is defined on the one hand by the length l of the housing 27 of the mixing apparatus 18 and 19 respectively and by the length of the exhaust line 25 and 26 respectively extending between the mixing apparatus 18, 19 and the emission control device 20, 21.

Under certain conditions, the exhaust lines 25, 26 can be completely omitted so that the outlet connection 31 of the housing 27 of the respective mixing apparatus 18, 19 is then directly connected to a corresponding inlet connection of the housing 39 of the respective emission control device 20, 21.

In the mixing apparatus 18, 19, preferentially no catalytic converters whatsoever are arranged. In particular when the exhaust lines 25, 26 are completely omitted, a catalytic converter can under certain conditions extend into the region of the mixing apparatus 18, 19 but then takes up maximally 10% of the volume of the mixing apparatus 18, 19.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A mixing apparatus of an SCR exhaust gas aftertreatment system configured to mix a precursor substance of a reducing agent with exhaust gas, comprising:
    a housing that provides a mixing chamber and a silencer, the housing having:
        an inlet side;
        an outlet side opposite the inlet side; and
        side walls that extend between the inlet side and the outlet side;
    an inlet connection for a feed line arranged at the inlet side and configured to introduce the exhaust gas into the housing;
    an outlet connection for a discharge line arranged at the outlet side and configured to discharge the exhaust gas and reducing agent intermixed with the exhaust gas from the housing;
    wherein a longitudinal axis of the inlet connection and a longitudinal axis outlet connection are offset relative to one another and are one of parallel or perpendicular to one another; and
    an introduction device configured to introduce the precursor substance of the reducing agent into the exhaust gas, arranged at the inlet side in a region of the longitudinal axis of the outlet connection,
    wherein a length of the housing between the inlet side and the outlet side of the housing is at least 1.9 times and maximally 7 times a diameter of the inlet connection or the feed line,
    wherein a width of the housing between the side walls of the housing is maximally 3 times a diameter of the inlet connection or a diameter of the feed line.

2. The mixing apparatus according to claim 1, wherein the length of the housing is one of:
    at least 2.2 times the diameter of the inlet connection or the diameter of the feed line and
    at least 3.3 times the diameter of the inlet connection or the diameter of the feed line.

3. The mixing apparatus according to claim 1, wherein the width of the housing is one of:
    maximally 2.5 times the diameter of the inlet connection or the diameter of the feed line and
    maximally 1.8 times the diameter of the inlet connection or the diameter of the feed line.

4. The mixing apparatus according to claim 1, wherein the diameter of the inlet connection or the diameter of the feed line is at least one of:
    160 mm,
    190 mm, and
    200 mm.

5. The mixing apparatus according to claim 1, wherein the diameter of the outlet connection or the diameter of the discharge line is dimensioned in such that a flow velocity of the exhaust gas in a region of the outlet connection is maximally one of:
    70 m/s,
    60 m/s, and
    50 m/s.

6. The mixing apparatus according to claim 1, wherein a height of the housing is dimensioned in such a manner that the offset of the longitudinal axis of the inlet connection and the longitudinal axis outlet connection is at least one of:
    at least one times the diameter of the inlet connection or the diameter of the feed line,
    at least 1.5 times the diameter of the inlet connection or the diameter of the feed line, and
    at least 2 times the diameter of the inlet connection or the diameter of the feed line.

7. The mixing apparatus according to claim 1, wherein the silencer formed by the housing is at least one of:
    a Helmholtz resonator,
    a λ/4-resonator,
    an absorption resonator, and
    a reflective silencer.

8. The mixing apparatus according to claim 1, further comprising at least one of:
    a first perforated or slotted pipe that extends from the inlet connection that allows the exhaust gas to enter the housing via the perforated or slotted pipe in the region of the inlet connection and
    a second perforated or slotted pipe that extends into the outlet connection that allows the exhaust gas to leave the housing via the second perforated or slotted pipe in the region of the outlet connection,
    wherein a free cross section of an individual perforated or slotted aperture of each respective first and second perforated or slotted pipe is one of
    maximally 20% of a free cross section of the inlet connection,
    maximally 10% of the free cross section of the inlet connection, or
    maximally 5% of the free cross section of the inlet connection.

9. An exhaust gas aftertreatment system for an internal combustion engine configured as an SCR exhaust gas aftertreatment system for an internal combustion engine operated with heavy fuel oil or residual oil, comprising:
    an emission control device having a housing that provides a reactor chamber for receiving at least one SCR catalytic converter and a main silencer;
    a mixing apparatus positioned upstream of the emission control device and is configured to mix a precursor substance of a reducing agent with exhaust gas, comprising:
        a second housing that provides a mixing chamber and a front silencer, the housing having:
            an inlet side;
            an outlet side opposite the inlet side; and
            side walls that extend between the inlet side and the outlet side;
        an inlet connection for a feed line arranged at the inlet side and configured to introduce the exhaust gas into the housing;
        an outlet connection for a discharge line arranged at the outlet side and configured to discharge the exhaust gas and reducing agent intermixed with the exhaust gas from the housing;
        wherein a longitudinal axis of the inlet connection and a longitudinal axis outlet connection are offset relative to one another and are one of parallel or perpendicular to one another; and
an introduction device configured to introduce the precursor substance of the reducing agent into the exhaust gas, arranged at the inlet side in a region of the longitudinal axis of the outlet connection,
wherein a length of the housing between the inlet side and the outlet side of the housing is at least 1.9 times and maximally 7 times a diameter of the inlet connection or the feed line,
wherein a width of the housing between the side walls of the housing is maximally 3 times a diameter of the inlet connection or a diameter of the feed line.

10. The exhaust gas aftertreatment system according to claim 9, wherein at least one of:
the main silencer dampens frequencies below a limit value better than the mixing apparatus and
the front silencer dampens frequencies above limit value better than the main silencer.

11. The exhaust gas aftertreatment system according to claim 9, wherein an insertion loss of the front silencer is at least one of:
at least 10% an insertion loss of the main silencer,
at least 20% the insertion loss of the main silencer, and
at least 30% of the insertion loss of the main silencer.

12. The exhaust gas aftertreatment system according to claim 9, wherein a distance between the inlet side of the second housing of the mixing apparatus and an inlet front face of the or each SCR catalytic converter is at least one of:
at least 3 times a diameter of the inlet connection or a diameter of the feed line,
at least 4 times the diameter of the inlet connection or the diameter of the feed line, and
at least 5 times the diameter of the inlet connection or the diameter of the feed line.

13. The exhaust gas aftertreatment system according to claim 9, wherein an exhaust line extending between the mixing apparatus and the emission control device is diversion-free.

14. The exhaust gas aftertreatment system according to claim 9, wherein an exhaust line extending between the mixing apparatus and the emission control device has a maximum diversion of one of: 100°, 60°, and 30°.

15. The exhaust gas aftertreatment system according to claim 9, wherein an exhaust line extending between turbochargers and the mixing apparatus has a maximum diversion of one of: 180°, 150°, and 120°.

16. An internal combustion engine, with a plurality of cylinders which form a plurality of cylinder banks, wherein the exhaust gas of each cylinder bank can be conducted via one of:
at least one separate mixing apparatus in each case the at least one separate mixing apparatus of an SCR exhaust gas aftertreatment system configured to mix a precursor substance of a reducing agent with exhaust gas, comprising:
a housing that provides a mixing chamber and a silencer, the housing having:
an inlet side;
an outlet side opposite the inlet side; and
side walls that extend between the inlet side and the outlet side;
an inlet connection for a feed line arranged at the inlet side and configured to introduce the exhaust gas into the housing;
an outlet connection for a discharge line arranged at the outlet side and configured to discharge the exhaust gas and reducing agent intermixed with the exhaust gas from the housing;
wherein a longitudinal axis of the inlet connection and a longitudinal axis outlet connection are offset relative to one another and are one of parallel or perpendicular to one another; and
an introduction device configured to introduce the precursor substance of the reducing agent into the exhaust gas, arranged at the inlet side in a region of the longitudinal axis of the outlet connection,
wherein a length of the housing between the inlet side and the outlet side of the housing is at least 1.9 times and maximally 7 times a diameter of the inlet connection or the feed line,
wherein a width of the housing between the side walls of the housing is maximally 3 times a diameter of the inlet connection or a diameter of the feed line, or
a separate exhaust gas aftertreatment system for an internal combustion engine configured as an SCR exhaust gas aftertreatment system for an internal combustion engine operated with heavy fuel oil or residual oil, comprising:
an emission control device having a housing that provides a reactor chamber for receiving at least one SCR catalytic converter and a main silencer;
a mixing apparatus positioned upstream of the emission control device and is configured to mix a precursor substance of a reducing agent with exhaust gas, comprising:
a second housing that provides a mixing chamber and a front silencer, the housing having:
an inlet side;
an outlet side opposite the inlet side; and
side walls that extend between the inlet side and the outlet side;
an inlet connection for a feed line arranged at the inlet side and configured to introduce the exhaust gas into the housing;
an outlet connection for a discharge line arranged at the outlet side and configured to discharge the exhaust gas and reducing agent intermixed with the exhaust gas from the housing;
wherein a longitudinal axis of the inlet connection and a longitudinal axis outlet connection are offset relative to one another and are one of parallel or perpendicular to one another; and
an introduction device configured to introduce the precursor substance of the reducing agent into the exhaust gas, arranged at the inlet side in a region of the longitudinal axis of the outlet connection,
wherein a length of the housing between the inlet side and the outlet side of the housing is at least 1.9 times and maximally 7 times a diameter of the inlet connection or the feed line,
wherein a width of the housing between the side walls of the housing is maximally 3 times a diameter of the inlet connection or a diameter of the feed line.

17. The internal combustion engine according to claim 16, wherein the exhaust gas of each cylinder bank can be united downstream of the respective mixing apparatus or downstream of the respective emission control device and conducted via a common chimney.

18. The exhaust gas aftertreatment system according to claim 1, wherein the precursor substance of the reducing agent is an ammonia precursor substance.

19. The exhaust gas aftertreatment system according to claim 1, wherein the width of the housing is maximally 2.5 times the diameter of the inlet connection or the diameter of the feed line.

20. The exhaust gas aftertreatment system according to claim 1, wherein the width of the housing is maximally 1.8 times the diameter of the inlet connection or the diameter of the feed line.

* * * * *